United States Patent [19]

Hamilton

[11] Patent Number: 5,721,923
[45] Date of Patent: Feb. 24, 1998

[54] APPARATUS AND METHOD OF DISTRIBUTING CALL PROCESSING RESOURCES

[76] Inventor: Chris Hamilton, 41 Harrison Ave., Montclair, N.J. 07042

[21] Appl. No.: 713,139

[22] Filed: Dec. 1, 1995

Related U.S. Application Data

[63] Continuation of Ser. No. 266,174, Jun. 27, 1994, abandoned.

[51] Int. Cl.[6] .................................................. G06F 9/00
[52] U.S. Cl. .......................... 395/674; 379/88; 379/410; 364/281; 364/281.6
[58] Field of Search ............................. 395/650, 674; 379/67, 88, 89, 92, 112, 113, 120, 121, 133, 134, 157, 165, 201, 243, 244, 245, 279, 406, 410, 423; 370/60; 364/281, 281.6

[56] References Cited

U.S. PATENT DOCUMENTS

| | | | |
|---|---|---|---|
| 4,319,090 | 3/1982 | Garwood et al. | 379/113 |
| 4,497,978 | 2/1985 | Schoute et al. | 379/279 |
| 4,912,698 | 3/1990 | Bitzinger et al. | 379/279 |
| 4,959,854 | 9/1990 | Cave et al. | 379/157 |
| 4,974,256 | 11/1990 | Cyr et al. | 379/113 |
| 5,161,154 | 11/1992 | Diaz et al. | 379/243 |
| 5,189,667 | 2/1993 | Esaki et al. | 370/60 |
| 5,263,083 | 11/1993 | Rust et al. | 379/157 |
| 5,303,369 | 4/1994 | Borcherding et al. | 395/650 |
| 5,325,525 | 6/1994 | Shan et al. | 395/650 |
| 5,329,579 | 7/1994 | Brunson | 379/88 |
| 5,408,334 | 4/1995 | Yamagishi et al. | 379/88 X |
| 5,473,773 | 12/1995 | Aman et al. | 395/650 |
| 5,628,013 | 5/1997 | Anderson et al. | 395/677 |

*Primary Examiner*—Krista Zele
*Assistant Examiner*—Scott L. Weaver
*Attorney, Agent, or Firm*—Jeffrey I. Kaplan

[57] ABSTRACT

A technique for allocating resources in a call processing system is disclosed whereby different levels of resources are allocated depending upon the available headroom in the system. The technique allows advanced and better performing signal processing methods to be used when the system is relatively idle, and acceptable but less robust algorithms to be used when system loading is heavy.

11 Claims, 2 Drawing Sheets

| RESOURCE TYPE | RESOURCE LEVEL | ALLOCATION CONDITIONS (HEADROOM) |
|---|---|---|
| ECHO CANCELLATION 201 | BASIC 202 | MEMORY < M, CHANNELS < C   208 |
| | INTERMEDIATE 203 | M ≤ MEMORY ≤ M', C ≤ CHANNELS ≤ C'   200 |
| | ADVANCED 204 | MEMORY > M', CHANNELS < C'   210 |
| VOICE RECOGNITION 205 | BASIC 206 | MEMORY ≤ MV, CHANNELS ≤ CV   211 |
| | ADVANCED 207 | MEMORY > MV, CHANNELS > CV   212 |

APPARATUS AND METHOD OF DISTRIBUTING CALL PROCESSING RESOURCES

This application is a continuation of application Ser. No. 08/266,174, filed Jun. 27, 1994, now abandoned.

TECHNICAL FIELD

This invention relates to telephony, and more specifically, to a technique for maximizing the efficiency of a Voice Processing System (VPS).

DESCRIPTION OF THE PRIOR ART

Voice Processing Systems have become prevalent over the last few years. Typically, such systems are implemented using a personal computer (PC) or other type of circuit card rack and a plurality of voice boards. The voice boards may include functions such as dual tone multi frequency (DTMF) detection, call progress monitoring and analysis, text to speech (TTS) capability, echo cancellation, speech recognition, and a variety of other well known functions required and/or desired in such VPS systems.

The voice boards are typically designed to handle more than one telephone line. Many commercially available voice processing boards can handle four or more lines (i.e.; channels) simultaneously. These boards can be used to construct systems which can service dozens or even hundreds of incoming calls. Such multi-channel voice processing systems must be designed such that sufficient system resources (e.g.; CPU power, memory, etc.) are available to handle worst case loading.

For example, a typical echo canceling filter in a VPS is implemented in software on a digital signal processor (DSP). Two important characteristics of the filter are the value of N and the particular filtering algorithm.

As is well known in the field of digital signal processing, as N increases, the accuracy of the filter increases. However, increased N results in increased computational requirements which can noticeably burden, or even exceed, the limitations of the system. In general, the same rule usually holds true with respect to the complexity of the filtering algorithm: the more complex the algorithm, the better the results. Complex algorithms however, can also burden the system beyond capacity.

Considering the choice of N, in practical systems which utilize echo cancelling, N must be chosen small enough so that if all of the channels are active and require echo cancellation, there still exists sufficient system resources to provide echo cancellation on all channels. This choice of N however, means that when only a relatively small number of channels are active (i.e.; the low activity state), the system is not providing the best echo cancellation that it could. Specifically, in the low activity state, all of the system resources are not fully utilized, since enough extra capacity must always be reserved to handle worst case performance.

Those of ordinary skill in this field know how to pick N and the appropriate filtering algorithm such that in a worst case scenario, there are enough system resources to handle echo cancellation on all of the channels. Thus, in a four channel VPS for example, N will be chosen such that if all four channels are simultaneously in playback mode and therefore all require echo cancellation, there is enough memory, processing power, etc. to implement four N-tap echo cancelling filters. Relevant parameters for choosing N include CPU speed, desired processing speed, number of channels, etc., all of which are known in the art.

The problem with such systems is that there are two competing interests: Increased accuracy and performance (achieved by increasing N) and required system computing power and resources (worsened by increasing N). More particularly, while a relatively high N results in a better filter, use of a high N requires more system resources, faster processors, etc.

Moreover, while echo cancelling is discussed as an example, other call processing features give rise to the same issues. For example, in speech recognition, highly accurate algorithms require a large amount of processing power when compared with slightly less complex algorithms which are not as accurate. Therefore, it can be appreciated that there exists a need in the art for a technique to achieve the quality and performance produced by relatively complex algorithms, without using the additional resources required by such algorithms. Alternatively speaking, there exists no known method of balancing the two competing interests.

SUMMARY OF THE INVENTION

The above and other problems of the prior art are overcome in accordance with the present invention which relates to a VPS which dynamically distributes system resources depending upon the load placed upon the system. In accordance with the present invention, the VPS includes a specified amount of resources, (e.g.; memory, CPU processing power, etc.), which may be assigned to any one of many channels in a call processing application. These resources are assigned to a channel when an application processing a call on that channel requests a particular service provided by the resources.

A special software module, the system manager, assigns the resources to calls as needed, keeps track of resources surrendered by calls which no longer require such resources, and keeps track of the amount of memory and computational power used by each resource. It is also aware of the total amount of memory and computational power available to the entire system and therefore, the total amount of system headroom.

As each new call comes in, it utilizes an unoccupied channel in the system. System resources are assigned to channels as they are requested. When a call is finished using a resource, the resource is surrendered.

If echo cancellation, for example, is requested for a channel, then the system manager will assign an echo canceling filter, the length of which is based on the remaining headroom for the entire system. For example, if a relatively large percentage of available resources are in use, then only a simple echo cancelling filter, which utilizes a relatively small amount of processing power and memory, will be assigned. The simple filter may be of relatively short length and would comprise a relatively straightforward digital signal processing algorithm. If however, a call requests an echo canceler and a relatively small percentage of system resources are active, then better echo cancellation can be achieved for this call by assigning a relatively large N filter to provide echo cancellation for this call.

The system manager assures that when a call requests a particular resource type (e.g.; DTMF detection, echo cancellation, etc.), that resource is allocated. However, the resource level allocated varies depending upon the amount of headroom. Headroom, in different embodiments of the invention, may be measured as (i) the total number of system channels minus the number of active channels, (ii) the total number of system channels, minus the number of channels using a particular resource, (iii) the total amount of CPU power and/or memory, minus that being used presently or (iv) some other way including a combination of one or more of the above. However, headroom is some measure of the level of system activity.

By assigning resource levels based upon headroom, the system resources are dynamically allocated among the different telephone calls as needed. Thus, in echo cancellation, an efficient compromise is reached between highly complex filters, which improve performance, and simpler filtering techniques which lower the required resources for the VPS and therefore prevent system capacity from being exceeded.

While echo cancellation has been used for exemplary purposes, it is understood that the scope of the invention is broader. Specifically, the technique is applicable to any service which may be required by a call and which has different service levels.

BRIEF DESCRIPTION OF THE DRAWING

FIG. 2 shows a table to be stored in memory and used to select different resource levels.

DETAILED DESCRIPTION OF THE PREFERRED EMBODIMENT

Figure 1:
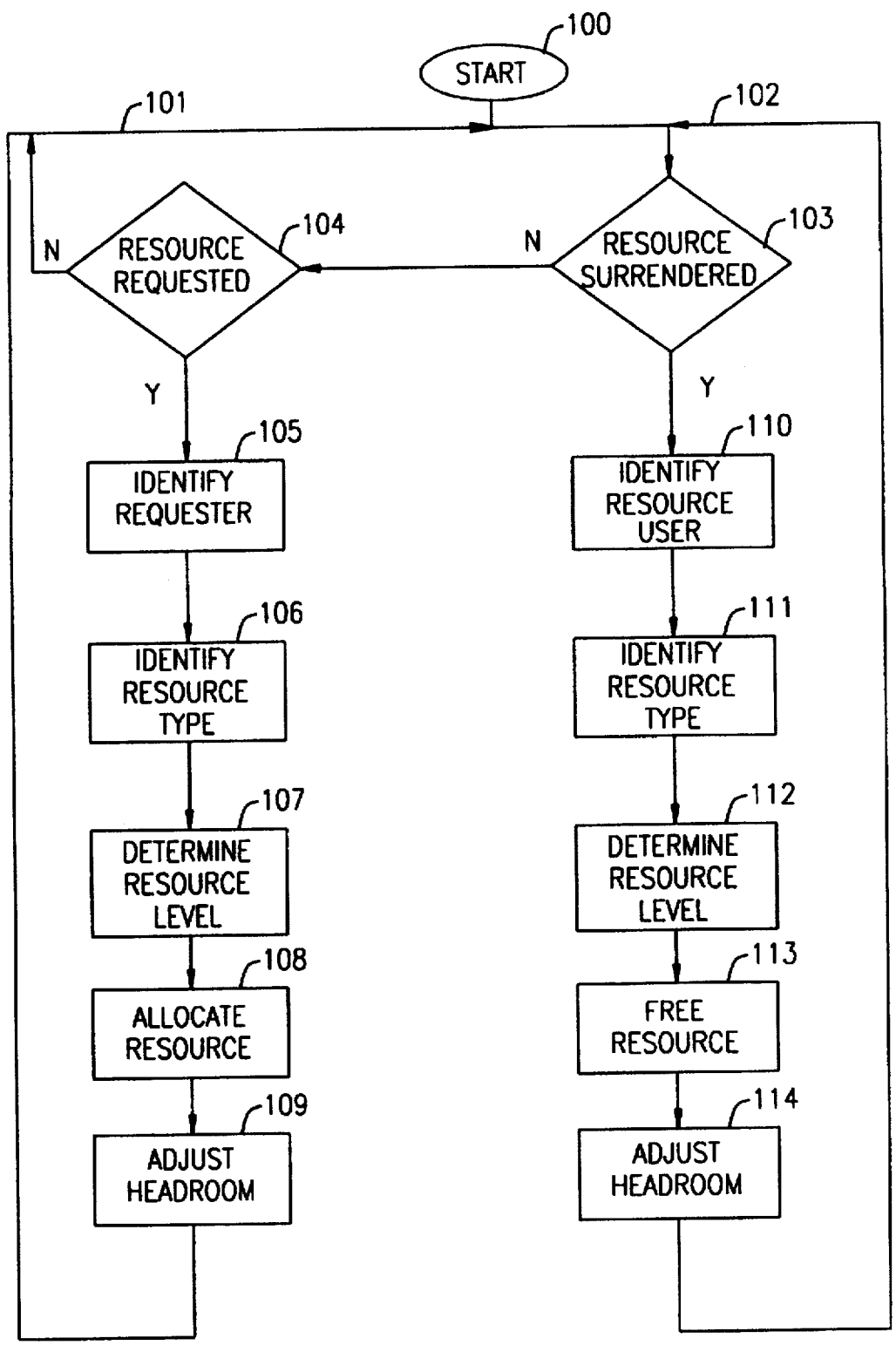
FIG. 1 depicts an exemplary flow chart for use in a Voice Processing System to implement the present invention.

FIG. 1 depicts a block diagram indicating program flow and control for allocating and surrendering resources required by various call processing applications. The arrangement of FIG. 1 includes a left branch 101, intended to perform all of the processing functions required for a call processing resource to be allocated to a particular call, and a right branch 102 which includes the functional blocks required to surrender resources when a call ends, or when such resources are no longer required by a particular call.

The actual software for implementing the flow chart of FIG. 1 may be written as a set of one or more modules termed herein a system manager. It is understood that the flow chart of FIG. 1 illustrates only the steps required to explain the present invention and that other conventional portions of the VPS are not shown.

We consider first a fully stable situation; i.e.; a plurality of calls are being processed by the VPS and all of the calls have previously been allocated all of the resources required for processing. No new calls are arriving, and none of the calls being processed are requesting new resources or surrendering their resources.

In such a case, the flow chart of FIG. 1 runs in a loop, which is entered at start 100. Decision block 103 checks to see if any resources have been surrendered, and since they have not, transfers control to decision block 104. Decision block 104 checks to see if any existing calls have requested new resources, or if new calls requiring new resources have been received. If not, control is once again transferred back to decision block 103. Thus, in a stable situation, decision blocks 103 and 104 simply alternatively check to see if new resources are required or if resources being used have been relinquished.

In order to further discuss left branch 101, we now consider the case where a new resource is required. For example, a new call may arrive which requires a DTMF detector to be allocated for processing of this new call, or an existing call may request a text to speech converter, or playback mode may begin, thereby requiring echo cancellation for a channel. Many other examples of situations where a new resource would be required will be apparent to those of ordinary skill in the art and with basic familiarity with call processing systems.

When a resource is requested, decision block 104 transfers control to operational block 105 which identifies the particular requestor, i.e.; the particular call and channel requiring the resource. After the request is identified, control is transferred to operational block 106 which determines what type of resource is required. For example, operational block 106 may determine that an echo canceler is required because the particular call in question is about to enter the playback mode. Other examples may be that a text to speech converter is required, or other such resource.

After determining what type of resource is required, control is transferred to operational block 107 which determines what resource level is required. The resource level will vary depending upon the amount of headroom in the system.

For example, consider a case where an echo canceler is the resource type requested as determined by operational block 106. A large variety of echo cancelers may be available which vary in filter length, sophistication of algorithm, memory requirements, etc. If there is a large amount of headroom in the system (e.g.; only three or four of 64 total lines are presently active), then relatively good echo cancellation can be achieved by selecting a fairly complex echo cancellation algorithm with a relatively long filter length and which requires a relatively large amount of other system resources. The selection algorithm will be discussed in more detail later herein.

On the other hand, if a large number of system resources are presently being used because nearly all of the channels are presently active, then a less sophisticated echo canceler will be used. The performance of such a less sophisticated echo canceler will be acceptable, although not as good as the performance of a more complex echo canceler which might be used if more headroom existed.

After the resource level is selected, the appropriate resources are allocated by operational block 108 and the headroom is adjusted at operational block 109. Adjustment of the headroom indicates to the system manager that an additional line has been activated, that additional memory is now utilized because of the newly allocated echo canceler, that less processing power is available, etc. The technique of keeping track of headroom is not critical to the present invention but several examples will be described later herein.

After adjusting the headroom, the system manager program returns to decisional block 103 to continue checking for surrendered resources and/or requested resources. The program enters right hand branch 102 when a call no longer requires resources being used.

Concerning the right hand branch 102, resources may be surrendered by particular call processing applications. When a call processing application indicates that a resource is to be surrendered, decisional block 103 receives an appropriate message and transfers control to block 110 which identifies which particular call processing application and/or telephone call is utilizing the resource to be surrendered. The resource type and level is then noted at blocks 111 and 112.

Thus, after executing operational block 112, the system manager will know the particular additional memory, processing power, etc. which is now available for use by another call. These resources are then surrendered at block 113 and the headroom adjusted (increased) at block 114. Control is then transferred back to the loop comprised of decision block 103 and 104, which continually looks for new resources to be allocated or allocated resources to be surrendered.

The system manager is preprogrammed to know which resource levels are available for each resource type, as well as the memory, CPU power, etc. required by each resource type and level. Thus, the system manager can easily ascertain, when a resource is allocated or surrendered, how much to increase or decrease the headroom.

Consider for example a first call arriving at the voice processing system. When the call is answered, a DTMF detector is allocated to that call. Upon allocating such DTMF detector, the system manager logs the amount of memory, processing power, etc. required by the DTMF detector and adjusts the headroom accordingly. Moreover, the processing of this call in and of itself requires a certain amount of CPU power and thus the available CPU power is adjusted accordingly. As other resources are requested, the particular amount of headroom required by each is deducted from the available headroom.

One way of measuring available CPU power is to first derive the maximum average number of instructions per time unit desired to be executed by the CPU without degrading performance. One can then calculate the average number of instructions per time unit required to be executed by each of the different resources allocated and deduct this amount from the total available number of instructions per second to be executed. An example using this technique is set forth later herein. A simpler way is to just use the number of channels active at a given time. Other techniques will be apparent to those of ordinary skill of the art.

We turn now to FIG. 2, which sets forth a simplified version of a table to be stored in memory for use by operational block 107 of FIG. 1 in order to determine the resource level to be allocated for a particular call requesting such a resource. The table of FIG. 2 shows only two resource types: echo cancellation and voice recognition. It is understood that in an actual system many other such resource types would be present.

Echo cancellation block 201 includes three resource levels; basic, intermediate and advanced, as indicated by blocks 202–204, respectively. Voice recognition block 205 includes two resource levels, basic and advanced 206 and 207, respectively. The variables M, C, M', C', MV and CV represent different amounts of memory and processing power. The appropriate values of these parameters depend upon the particular algorithms chosen. Those of ordinary skill in this art are aware of how to choose the proper amount of memory and processing power required for a system.

Consider a situation where a particular call requests echo cancellation resources. Blocks 202 and 208 indicate that if the available memory in the system is less than M and the number of inactive channels is less than the value C, then the basic echo cancellation algorithm will be used. The basic cancellation algorithm includes the smallest N of the three algorithms used for echo cancellation. Thus, when there is only a small amount of memory available or when most of the channels are active in the system, the most basic algorithm, which presumably requires the least memory and processing power of the three resource levels shown, is utilized.

At block 203, it is indicated that an intermediate algorithm is utilized when there exists available memory of between M and M' and when the number of available channels is between C and C'. Finally, when the system is in a low activity state, block 204 shows that an advanced algorithm will be utilized if, when the echo cancellation resource is requested, the system has available memory of greater than M' and a number of inactive channels greater than C'.

The particular algorithms utilized as the basic, intermediate and advanced will not be discussed herein as numerous such algorithms are known in the area of digital signal processing. Moreover, the particular memory requirements and processing power for each of these algorithms can be readily calculated by the system designer. Indeed, the parameters must be calculated in prior systems in order to ensure that worst case loading can be handled.

In the exemplary system described, both memory and number of channels are parameters utilized for determining which resource level should be allocated. Therefore both of these parameters must be within the predefined limits in order for the particular resource level to be allocated. For example, if the available memory is greater than N' and the number of inactive channels is greater than C', then the system is in a low activity state and an advanced echo cancellation algorithm will be utilized.

If the available memory decreases to somewhere between M and M' then the intermediate algorithm needs to be used, even if the number of inactive channels is greater than C' Alternatively, if the number of available channels decreases to between C and C' then the intermediate algorithm must be used even if available memory is greater than M'. Such a system ensures that there is always enough memory and CPU processing power to effectively handle all of the calls being processed. Thus, the system looks for the "best" algorithm that can be executed within the confines of available memory and processing power.

Voice recognition block 205 may be carried out by a basic algorithm 206 or an advanced technique 207. As indicated at block 211, if the number of available channels is less than or equal to a predetermined number CV, or available memory does not exceed a predetermined constant MV, then the basic algorithm is used since headroom in the system is relatively low. However, if the number of inactive channels is greater than CV, and available memory is greater than MV, an advanced algorithm is used which provides better results but requires more capacity.

As previously explained, an alternative technique for calculating the available processing power is to utilize the average number of instructions per time unit which is required by each particular resource. This parameter is available to system designers and may be a better indicator of true system loading than simply using the number of active channels.

CPU processing power may be measured as the total available instruction cycles per second (e.g.; 100 million instructions per second). Additionally, the system designer is aware of the average number of instructions per second required by an echo cancellation algorithm, a DTMF detector, or any other such resource. Moreover, the system designer is also aware of the memory requirements for execution of each algorithm. Utilizing these parameters, the necessary values for design of the system can be calculated, as exemplified below.

Consider two exemplary voice recognition algorithms, a basic algorithm which requires an average of 2 million instructions per second to be executed, and an advanced algorithm which requires an average of 6 million instructions per second to be executed. Since the system can execute a total of 100 million instructions per second, allocation of the advanced algorithm requiring 6 million instructions per second to be executed would produce a total change in processing power of 6% while the basic algorithm would produce only a 2% change in processing power. Similar techniques may be applied to DTMF detection and other resources.

By keeping track of all of the resources and the changes in headroom caused by each resource, the system manager can ascertain the percentage of the entire processing power utilized. A system designer may decide that after seventy percent (70%), of the entire system is utilized (i.e.; the headroom falls below 30%), that a particular allocated resource should use a more basic algorithm rather than an advanced algorithm. Of course, memory requirements may be tracked via a similar technique.

It is understood that while the above describes the preferred embodiments of the invention, other variations and/or additions will be apparent to those of ordinary skill of this art. For example, the system can be arranged such that several resources are only allocated at one level, while other resources may be allocated at varying levels depending upon headroom. Moreover, headroom may be measured by parameters other than processing power and memory, and the system manager may be implemented utilizing techniques other than that indicated by the flow chart of FIG. 1. It is also important to note that unlike prior systems, the resource level is determined after it is decided that the resource is needed. Thus, resource levels can reflect system loading at the time the resource is needed. It is understood that all of these and other variations are intended to fall with the spirit and scope of the appended claims.

We claim:

1. A method of allocating resources in a call processing system, each resource having plural resource levels, each resource level implementing a resource using a different algorithm, one of said plural resource levels being a maximum resource level that can be allocated, said call processing system including a maximum level of system activity and a present level of system activity, said present level of system activity being a level of system activity at a time of allocation of one of said resources to process a call, the method comprising the steps of:

determining a resource to be allocated, measuring the present level of system activity;

allocating, in response to said step of measuring, said resource at one of said resource levels to said call at a resource level lower than a maximum level that can be allocated based upon the present level of system activity if such present level of system activity is greater than a predetermined fraction of said maximum level of system activity.

2. The method of claim 1 wherein the step of measuring comprises the step of subtracting a value indicative of the present level of system activity from a value indicative of the maximum level of system activity.

3. The method of claim 2 wherein the present level of system activity comprises a number of operations per second being performed by said call processing system, and the maximum level of system activity comprises the maximum number of operations per second that can be performed by said call processing system.

4. The method of claim 2 wherein the present level of system activity comprises an amount of memory being used by said system, and the maximum level of system activity comprises the maximum amount of memory in the system.

5. The method according to claim 1 wherein said resource is an echo canceler.

6. The method according to claim 1 wherein said resource is a speech recognizer.

7. The method of claim 4 further comprising the step of storing a new level of system activity when one of said resources is allocated or when one of said resources is surrendered said new level of system activity accounting for said one of said resources which has been allocated or surrendered.

8. A method of allocating resources to calls in a call processing system based upon system activity in the call processing system, the method comprising the steps of:

determining a resource type to be allocated, each resource type comprising plural resource levels, measuring the present level of system activity in said call processing system, allocating, in response to said step of measuring, said resource type at a resource level which is less than a maximum resource level which can be allocated, based on said present level of system activity, in order to conserve headroom.

9. The method of claim 8 wherein the headroom comprises an amount of available processing power.

10. The method of claim 8 wherein the headroom comprises an amount of available memory.

11. Apparatus for performing a call processing function of a predetermined type, said apparatus comprising:

means for performing said function at any one of a plurality of levels, each of said levels requiring a different amount of system resources, means for determining, based upon use of system resources at a time when said function is to be performed, at which ones of said levels said function can be performed, and means for performing the function at one of said levels which is less than that which can be supported by the available system resources if available system resources are less than a predetermined amount.

* * * * *